United States Patent
Blants et al.

(10) Patent No.: US 7,283,812 B2
(45) Date of Patent: *Oct. 16, 2007

(54) CONTROL SYSTEM FOR SETTING UP A SHORT DISTANCE SECOND DATA TRANSMITTING CONNECTION TO A WIRELESS COMMUNICATION DEVICE IN ORDER TO SEND AN IDENTIFICATION MESSAGE

(75) Inventors: Lioudmila Blants, Espoo (FI); Valtteri Halla, Helsinki (FI); Jaakko Väisänen, Kirkkonummi (FI)

(73) Assignee: Nokia Corporation, Epsoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/521,759

(22) Filed: Sep. 15, 2006

(65) Prior Publication Data
US 2007/0010242 A1    Jan. 11, 2007

Related U.S. Application Data

(63) Continuation of application No. 10/088,315, filed as application No. PCT/FI00/00767 on Sep. 12, 2000, now Pat. No. 7,136,632.

(30) Foreign Application Priority Data
Sep. 17, 1999    (FI) .................................. 19991991

(51) Int. Cl.
H04M 3/42    (2006.01)
H04M 3/00    (2006.01)
H04Q 7/22    (2006.01)
H04B 7/00    (2006.01)

(52) U.S. Cl. ................... 455/414.1; 455/418; 455/419; 455/420; 455/41.2

(58) Field of Classification Search ............. 455/414.1, 455/418, 419, 420, 556.1
See application file for complete search history.

(56) References Cited

U.S. PATENT DOCUMENTS 5,646,605 A    7/1997    Leonaggeo et al.

(Continued)

FOREIGN PATENT DOCUMENTS

WO    WO93/14571    7/1993

(Continued)

*Primary Examiner*—George Eng
*Assistant Examiner*—Un C. Cho
(74) *Attorney, Agent, or Firm*—Alfred A. Fressola; Ware, Fressola, Van der Sluys & Adolphson LLP

(57) ABSTRACT

A control system comprising a device for setting up a short distance wireless second data transmission connection to a wireless communication device when it is within a short distance, the connection being arranged at least for transmitting an identification message to the communication device, the message containing data for identifying the control system; a receiver for receiving messages via a communication channel from a mobile communication network which is arranged to set up a wireless first data transmission connection to the communication device for the transmission of messages, and which mobile communication network also comprises an authentication module for identifying the communication device and for allowing the transmission of messages, and a processor at least for interpreting a control message transmitted from the communication device and received via the communication channel, the message containing at least data for controlling the control system in a desired manner.

49 Claims, 5 Drawing Sheets

| U.S. PATENT DOCUMENTS | | | | FOREIGN PATENT DOCUMENTS | | |
|---|---|---|---|---|---|---|
| 5,864,757 A | 1/1999 | Parker | | WO | WO98/06210 | 2/1998 |
| 5,875,395 A | 2/1999 | Holmes | | WO | WO99/22486 | 5/1999 |
| 5,937,358 A | 8/1999 | Gehrig | | WO | WO 00/38119 | 6/2000 |
| 5,963,624 A | 10/1999 | Pope | | WO | WO 00/45582 | 8/2000 |
| 6,161,005 A | 12/2000 | Pinzon | | WO | WO 00/56105 | 9/2000 |
| 6,295,448 B1 | 9/2001 | Hayes et al. | | WO | WO 00/62521 | 10/2000 |
| 6,671,522 B1 | 12/2003 | Beaudou | | | | |
| 7,136,632 B1 * | 11/2006 | Blants et al. ............... 455/418 | | * cited by examiner | | |

CONTROL SYSTEM FOR SETTING UP A SHORT DISTANCE SECOND DATA TRANSMITTING CONNECTION TO A WIRELESS COMMUNICATION DEVICE IN ORDER TO SEND AN IDENTIFICATION MESSAGE

CROSS-REFERENCE TO RELATED APPLICATIONS

This application is a continuation of U.S. patent application Ser. No. 10/088,315 filed on Mar. 15, 2002 now U.S. Pat. No. 7,136,632 and claims domestic priority to said application under 35 USC §120, which in turn claims priority to International Application No. PCT/FI00/00767 having an international filing date of Sep. 12, 2000 under all applicable sections of Title 35 of the United States Code including, but not limited to, Sections 120, 363 and 365(c), and which in turn claims priority under 35 USC §119 to Finnish Patent Application No. 19991991 filed on Sep. 17, 1999.

TECHNICAL FIELD

The present invention relates to a control system and wireless communication device for setting up a short distance second data transmitting connection to a wireless communication device in order to send an identification message.

BACKGROUND OF THE INVENTION

From various control and security systems, computer-controlled devices are known which comprise a lock device and a key device for opening said lock device. The key device comprises an identification code which is read by the system by using a reading device and which is used by the system to identify the key device and to control the lock device to open. By means of the control, it is possible in a programmed manner to prevent or allow the use of a certain key device and to enter new key devices in the system. For example, card-like key devices are known which contain a printed, readable bar code for the identification code.

In control systems, also transceivers are used, such as transponders, which contain an individual identification code stored in a read-only memory (ROM). Thus, the identification code is only readable, but transceivers may also contain a random access memory (RAM) for storing variable data. The reading device transmits a signal to the transceiver, e.g. a passive transponder, by means of an inductive coupling. This signal is transmitted, by means of the inductive coupling and after being modulated according to the identification code in the key device, back to the reading device. The typical reading distance of the reading device extends to about 0.1 metres. To some transponders, the reading device transmits a microwave frequency radio signal which is transmitted, after being modulated with the identification code, from the antenna of the transponder back to the reading device. The typical reading distance of the reading device extends to about 4.0 metres, and the reading device can identify several identifications at a time, but the identification also contains a power supply, such as a battery.

Known conventional lock and key devices also include a mechanical lock and key for buildings as well as an infrared transmitter for vehicles, such as automobiles, which is fitted in a mechanical key and which transmits a standardized encoded infrared signal, when needed. The code contained in said signal is received, identified, and the electrical locking system of the automobile releases the locking of the doors and often also releases the immobiliser system. For buildings is also known an electrical locking system which comprises a keypad and an electrically controlled lock device fitted next to a door. By means of the keypad, a code number is entered in the computer-controlled system and is identified, and if the code number is correct, the locking of the door is released and entry via the door is allowed.

However, the use of separate portable keys involves the problem of arranging the delivery of the keys in an efficient way, particularly supplying and dispatching of keys quickly to users or user groups as well as the returning of keys from the users. In particular, it is difficult to quickly serve persons who are occasionally or temporarily in need of keys. The return of borrowed keys to prevent their later use is uncertain and causes delays. Moreover, keys can be copied and used later without an authorization. In addition to this, the manufacture of the keys involves costs and time delays.

Separate keys can be abandoned by giving the users code numbers which are entered via a keypad to a control system. Problems are also involved in arranging the delivery of code numbers, particularly the safe and correct delivery of the code numbers to the users. Similarly, it may be difficult to keep the code numbers safely with the users, and memory-based safekeeping is uncertain. Moreover, as a result of the abundance of information related to the code number, such as encryption and confirmation, as well as the abundance of required code combinations, the length of the code numbers is increased, wherein also the risk of errors in their manual entry and use is increased.

SUMMARY OF THE INVENTION

It is an aim of the present invention to eliminate the above-presented problems and to achieve a system which makes it possible to efficiently dispatch keys to different users and to maintain them in a centralized manner. In particular, the purpose is to achieve a system whereby the use of the keys is simple and particularly reliable.

It is a central principle of the invention to utilize a wireless communication device and a communication network, such as a mobile telephone network, in the distribution of keys, particularly key codes, as well as in the transmission of messages intended to change the status of the control system. A central principle is also to utilize the mobile telephone network in the identification of the user. With the identification, the considerable advantage is achieved that the key codes are distributed to the correct wireless communication devices and that messages can only be transmitted by wireless communication devices with the respective right. Moreover, the identification gives the advantage that the use of key codes can be even totally abandoned. Furthermore, it is a central principle to set up a connection between users by means of the mobile telephone network to transfer keys and to set up a connection to the control system for the control. Another central principle is to facilitate the use of key codes and to reduce errors as the system takes care of the storage, selection and transmission of the codes. At the same time, also the selection of the codes and their duration in time, as well as the exclusion of certain users from the system can be effected in a particularly efficient way by using the system of the invention. The invention applies short-range data transmission, whereby it is easy to secure that the controlling communication device, such as a mobile phone, is in the vicinity of a gate or a door.

BRIEF DESCRIPTION OF THE DRAWINGS

In the following, the present invention will be described in more detail with reference to the appended drawings, in which.

DETAILED DESCRIPTION

Figure 1:
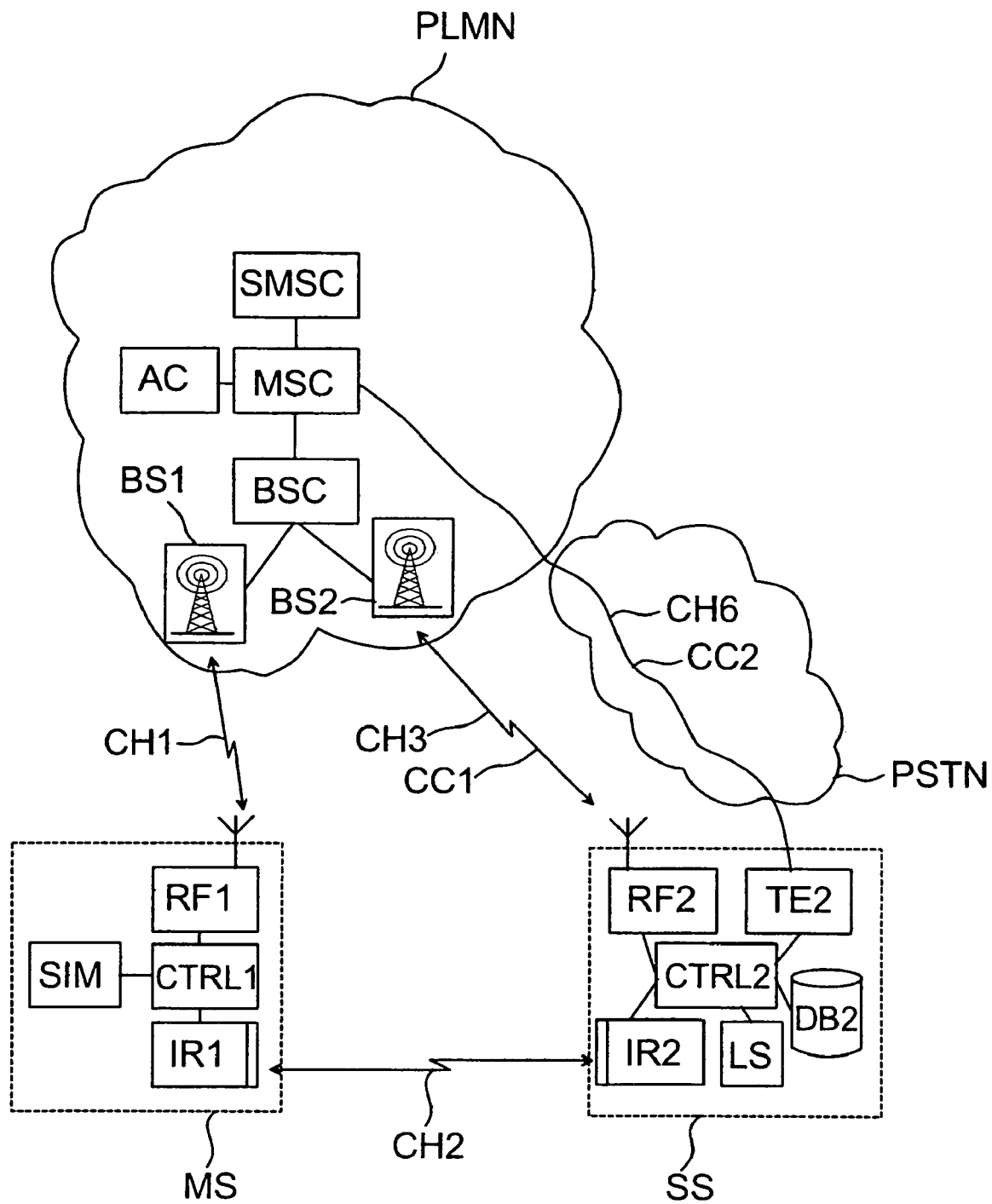
FIG. 1 shows a control system according to a first advantageous embodiment of the invention in a schematic view.
Figure 2:
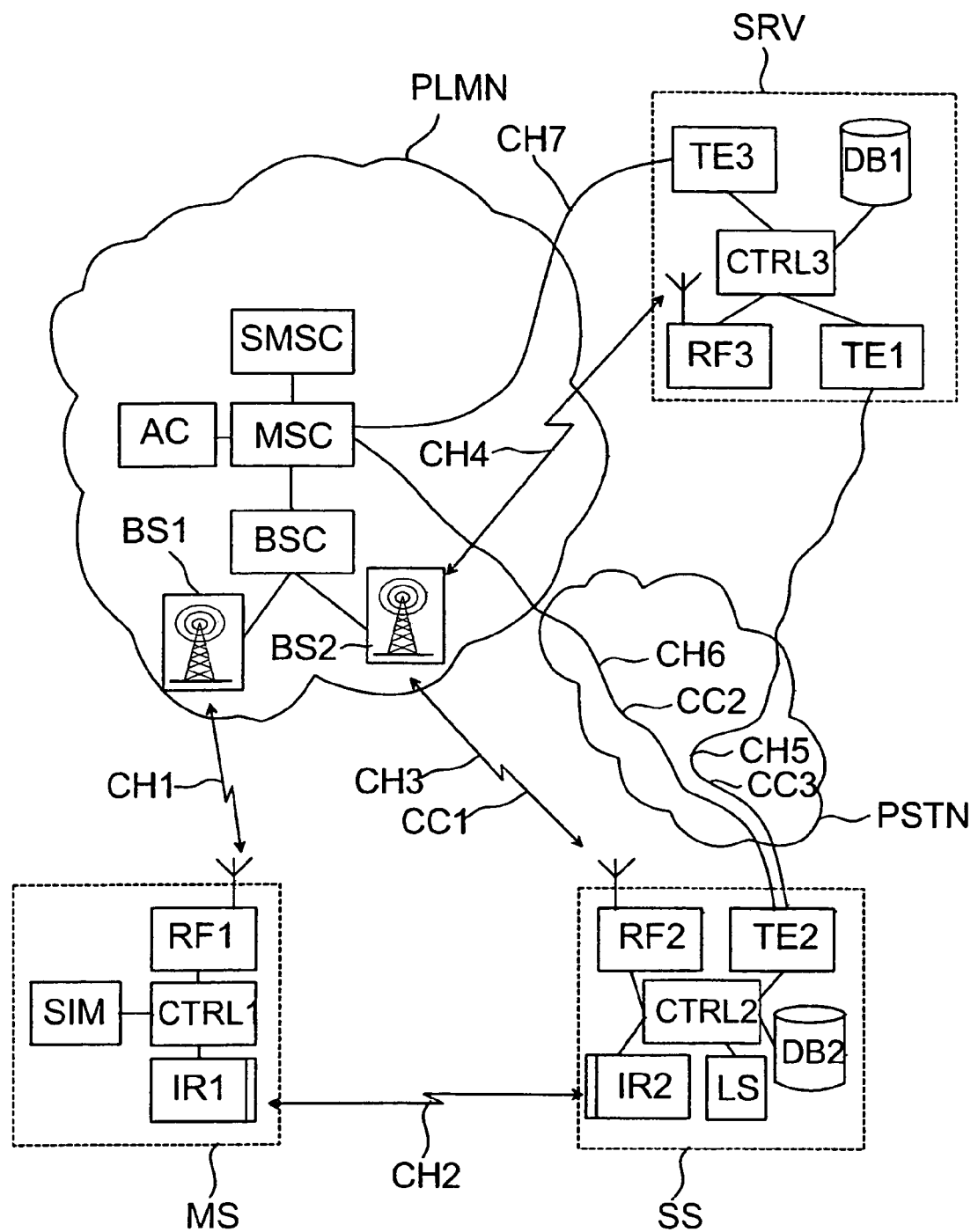
FIG. 2 shows a control system according to a second advantageous embodiment of the invention in a schematic view.

FIGS. 1 and 2 show some advantageous embodiments of the control system according to the invention. It should be noted that more precisely, only some of the elements of the figures are necessary in the different embodiments, which will be presented as follows.

With reference to FIG. 1, in the first embodiment of the invention, the control system SS is arranged to be controlled with a wireless communication device MS which comprises at least means RF1 to set up a wireless first data transmission connection CH1 to a public land mobile network PLMN. The connection CH1 is for example a radio channel according to the GSM system, which is arranged for the transmission and reception of messages, such as those of the short message service SMS. The mobile communication network PLMN is arranged for the transmission of messages via one or several possible communication channels CC1 and CC2 further.

In some embodiments of the invention, the public land mobile network PLMN also comprises authentication means AC, such as an authentication center according to the GSM system, for identifying said communication device MS and for allowing the transmission of messages. Authentication is necessary to exclude communication devices with no right to use the network for the transmission of data or messages, from the network. It is thus an advantage that it is possible to check the control rights not only in the control system SS itself but also in the network by using the functions and properties of the PLMN network. In a preferred embodiment of the invention, authentication is utilized also in such a way that the means AC are used to identify the communication device MS that transmitted the message and to supplement the messages to be transmitted, such as a control message MSG2, with identification data ID2 to identify the communication device MS.

Identification takes place e.g. in connection with logging of the communication device MS in the network, or at the beginning of each data transmission in a way typical for the respective network. For example in the GSM network (Global System for Mobile Communications), there is an individual key which is stored in the means AC and also on the SIM card of the mobile station MS. By using a random number transmitted by the network, an identification algorithm stored on the card is used to calculate with the key the result which is transmitted back to the network which compares the result with its own arithmetic operation. To allow data transmission, the results must be identical, and the key is also stored in the home location register (HLR) and in the visitor location register (VLR) of the network. Mobile stations can also be identified by using the individual IMSI code (International Mobile Subscriber Number) stored in the registers, or by using a temporary TMSI code (Temporary Mobile Subscriber Identity). For authentication of the device, also the IMEI code (International Mobile Equipment Identity) is used, by means of which it is possible to identify e.g. stolen devices. The network can usually also contain registers, such as an equipment identity register EIR containing stored information on the rights of the communication device, which information is verified and, if necessary, the use of the network for data transmission is permitted. It is obvious that the details of the authentication may vary from that presented in networks complying with different systems. However, in the authentication, it is possible to utilize means already existing in the systems, even as such.

Using said data ID2 it is possible to identify the communication device MS e.g. in the system SS and thereby to verify that e.g. key codes KC1 and KC2 are transmitted to the correct receiver, or that the communication device is authorized to control the system SS by means of control messages MSG2. The key code to be used is e.g. a key word, a sequence of numbers and letters, or a telephone number or another key agreed upon. In one embodiment, the control message MSG2 contains at least the telephone number of the transmitting communication device MS, the means AC adding the telephone number to the message. It is obvious that the authentication can be implemented in cooperation between several different parts of the PLMN network, such as a mobile switching center MSC and a short message switching center SMSC, known per se, by utilizing registers and databases. In a known manner, the SMSC center functions in such a way that the transmitting communication device MS is identified and the message to be transmitted is supplemented with the telephone number of the sender. According to a preferred embodiment of the invention, at least some of the messages MSG2, MSG3 and MSG4 to be used are short messages transmitted in a mobile communication network PLMN. In a public switched telephone network PSTN, short messages can also be transmitted as e-mail, and similarly, e-mail messages can be converted to short messages to be transmitted in a PLMN network. A server SRV can thus use e-mail messages for the transmission of key messages. Normally, these messages contain data on both the sender (ID2) and the receiver (ID1), e.g. to transmit the message to a correct location in the network and to select the communication channel.

Said communication device MS also comprises means IR1 to set up a short distance second wireless data transmission connection CH2 which is arranged at least for receiving messages, and control means CTRL1 for generating the messages to be transmitted and for interpreting the received messages. The messages are stored in memory means SIM, such as a subscriber identity module (SIM) or in a random access memory (RAM). The SIM unit can be a separate smart card which is connected to a terminal and which contains a stored PIN (Personal Identification Number) code that is to be entered via the keypad of the communication device e.g. to take a mobile phone into use. The code is a kind of a password which can be used to prevent the use of a stolen device. This means that to control the security system SS, also the PIN code must be known, which feature reduces the risk of misusing the control. Said connection CH2 is e.g. a short distance radio frequency (SDRF), low power radio frequency (LPRF) or infrared (IR) connection whose range extends to some tens of metres. In case the control system comprises a door locking device whose opening and closing is controlled, the range is advantageously only a few metres in the vicinity of said door. The connection can comply to e.g. the WAP (Wireless Application Protocol) system, and messages are transmitted by means of radio signals or infrared signals. Thus, also the devices are programmed and arranged for the WAP system. In this case, there are already the necessary equipment for the system SS in the vicinity of said door, such as a transceiver to set up said connection. Other uses for applying the system include for example various gates for persons and vehicles, e.g. for entry into parking areas, storage areas, or a building. By means of the system, it is possible to control the entry into a space or area via a specific passage indoors and outdoors. It is also feasible that the system can be used to supply goods e.g. into a storage system or a mailing system, wherein databases are used to store information on the goods in question and identification data of the mobile phone for later use.

In the presented embodiment, the control messages are primarily transmitted via a first connection CH1. Furthermore, the dispatch of key codes to the communication device MS is executed via the first connection CH1, wherein the dispatch is effected from a server SRV or another communication device. The server SRV can maintain the key codes and data related to the system SS. In this embodiment, particularly authentication means are utilized to improve security. In a corresponding manner, the control system SS according to the invention also comprises means, such as a modem IR2, to set up said short distance wireless second data transmission connection CH2 to said communication device, the connection being arranged at least for the transmission of an identification message MSG1. The identification message MSG1 comprises data ID1 for identifying a control system SS. The system SS also comprises means, such as a radio modem RF2 and/or a modem TE2, at least for receiving a control message MSG2 via a communication channel CC1 and/or CC2. The data ID1 is necessary for the transmission of a message, such as the control message MSG2, via the network PLMN and the communication channel to the correct system SS. There can be several systems SS connected to the network PLMN, wherein they must each be identified in order to send the messages to the correct location. The same applies also to communication devices MS which must be identified in some way for the transmission of messages. This is typically performed by means of a telephone number.

The connection CH2 can be set up, when the communication device MS enters within said distance for example in such a way that the user approaching a door carries the communication device MS and that the system SS continually transmits identification messages to the environment. The communication device MS can also request this identification message for example by means of a control message MSG2 transmitted via the connection CH2. The system SS also comprises processing means CTRL2 for interpreting the control message transmitted from the communication device MS and received via a communication channel CC1, CC2. Said control message MSG2 contains data CMD for controlling the control system SS in a desired way. The data CMD can be for example an opening command (RELEASE), a closing command (CLOSE), a command to keep open for some time (OPEN), a request to give key codes (ENTER KEY CODE), or a request to give an identification (ENTER IDENTIFICATION). Also, the control message transmitted via the connection CH1 preferably comprises data ID1 to identify the control system SS in order to transmit the message to the correct system and to the correct communication channel. The system also preferably comprises control means LS to control the operation of the control system SS on the basis of the control message MSG2, e.g. a locking device whose opening and closing is controlled by means of the control message MSG2. The system SS can also be arranged in such a way that for example the processing means CTRL2 are arranged to give the required control signals via an input/output (I/O) channel to external devices, the signals being transmitted to e.g. separate control means LS, such as a ready-installed lock device with the necessary I/O channels for external control. In this case, the system SS to be delivered does not always comprise said means LS. It is obvious that the signal in question can also be transmitted in a wireless manner.

The control system SS can acknowledge the control message MSG2 as received by means of an ACK/NACK message, wherein it can at the same time also report possible errors or, for example, the fact that the operation is prevented. This acknowledgement can be transmitted via the PLMN network to the communication device MS or to the PLMN network which reports the acknowledgement further to the communication device MS. Alternatively, the acknowledgement is made via the connection CH2.

According to a preferred embodiment, the control system SS further comprises memory means DB2 for storing at least one acceptable key code KC1, KC2. Furthermore, the processing means CTRL2 of the system SS are arranged to compare one or more key codes KC0 received with the control message MSG2 to one or more acceptable key codes KC1, KC2 to allow or prevent the control. The aim is that unauthorized wireless communication devices MS and also servers SRV cannot control the system SS without knowing an acceptable key code. The dispatch of the key codes and simultaneously the permission to control the system SS can be arranged by means of said server SRV in a way that will be described hereinbelow.

The memory means DB2 and the processing means CTRL2 of the control system SS can be implemented e.g. by means of a data processor which comprises processing means to control the operation of the device, a random access memory and a bulk memory for storage, and normally also a keypad and a display, and which is controlled by means of a control program stored in the memory. Said control program is arranged in such a way that said functions can be performed. It is also possible to connect necessary modem devices to the device by means of a channel according to the data transmission connections. The device can also be implemented in such a way that several control means, such as a locking system LS, of one building are controlled by means of a central device, such as a PC device (personal computer), which is connected via cabling to different means LS which can be e.g. devices in connection with each door, comprising IR2 means, such as an infrared transceiver, and preferably also a keypad, a display, and indicator lights to give instructions to the user of the communication device MS. The means LS can also comprise a memory for storing data and corresponding processing means to be controlled by means of a stored program. Moreover, the means LS comprise switching means required e.g. to open and close electrically controllable locks, and preferably also to keep them open during a programmed delay. It is obvious that the means LS and the data processor can also communicate in a wireless manner with each other. It is also obvious that one data processor can be used to take care of means LS located in other buildings and even further away. However, the required arrangement is formed according to the use, the data transmission connections available, and the need for use.

The key code KC0 received in the control message MSG2 can contain data ID2 which identifies the communication device MS that transmitted the message MSG2 in question and which is added to the message by the means AC. This data ID2 contains for example the telephone number of the communication device MS in question which is compared with the key codes allowed in the system SS, and on the basis of it, a decision is made on allowing the control. It is obvious that if the means AC do not identify the communication device MS in question or if they find that the communication device has no right to transmit messages, the network PLMN will totally prevent the transmission of control messages MSG2, wherein also the control of the system SS is not possible by using the communication device in question. According to an advantageous embodiment of the invention, also the transmission of key messages MSG3 to the communication device is prevented for the same reasons, wherein the control of the system both via the connection CH1 and via the connection CH2 is effectively prevented, improving data security.

Furthermore, the key codes KC1, KC2 can be arranged to have a limited duration, wherein e.g. a door can be opened by using them only at certain moments which can be a unique event or e.g. a daily repeated event. Occasional events may include entries of visitors or maintenance men in the building. Repeated events include for example postal transport and the passage of security guards. For this purpose, the key code may contain a time recordal, a time code or a corresponding encoding, normally encrypted, for checking, wherein the encoding describes the allowed time of use. The operation can also be controlled from the processing means CTRL3 of the server SRV or from the processing means CTRL2 of the system SS. The allowed times of use can also be stored in memory means DB1 or DB2. It is obvious that for occasional events, it is possible to create key codes which, after a certain time, are deleted from the lists of the memory means which refer to acceptable key codes. It is safest that the key codes and the key messages are arranged to be transmitted in an encrypted manner.

According to an advantageous embodiment of the invention, as a response to the control message MSG2 addressed to the system SS, transmitted from the communication device MS or alternatively also from the server SRV, the processing means CTRL2 are arranged to transmit an acknowledgement message MSG4 via a communication channel to the communication device MS. Said acknowledgement message MSG4 comprises data KC1, KC2 on acceptable key codes, and the key codes are intended, if necessary, to be added into the control message MSG2 which is transmitted from said communication device MS via a second data transmission connection CH2 which is thus arranged also for receiving messages. By means of the arrangement it can be secured that exactly the communication device MS in question, with the identification ID2, is located within the service range. For controlling the system SS, yet another feature is achieved to improve security, when the key code KC1, KC2 to be accepted at the time is arranged to be only generated or used for each control message MSG2 separately. In this way, misuse of the same key codes by outsiders later is avoided. The same effect is also obtained by checking the integrity of the message MSG2, wherein the message is supplemented with a serial number and/or a time, wherein the checking of the conditions can be performed by the CTRL1 part of the communication device MS, the SIM part, or different parts of the PLMN network (BSC, MSC, AC).

With reference to FIG. 2 and in yet another advantageous embodiment of the invention, the control system SS also comprises a server SRV which comprises at least means for transmitting key messages MSG3 via a communication channel CC1, CC2 and/or CC3 to the control system SS, and processing means CTRL3 for maintaining acceptable key codes KC1, KC2. It should be noted that for transmitting messages, the server SRV can also use the PLMN network to which it can communicate by means of a fixed connection CH7 or via the radio channel by means of a connection CH4. The connection CH7 can also be formed partly by means of a PSTN network. Said key message MSG3 contains data KC1, KC2 on acceptable key codes, and the message can be used to dispatch information on the key codes for storing them in the control system SS for comparison and for allowing or preventing the control. In an advantageous embodiment, the server SRV comprises means, such as a modem TE3 or a radio modem RF3, for transmitting key messages MSG3 via the network PLMN to the communication device MS which adds the key code, if necessary, to the control message MSG2 which is transmitted further via connections CH1 or CH2. Said key message MSG3 contains data KC1, KC2 about acceptable key codes for storing them in the memory means SIM of said communication device.

Said means, such as a modem TE1, a modem TE3 or a radio modem RF3, can all be included in the server SRV to make data transmission possible alternatively via several different communication channels, but the server may also contain only one of these. By means of the modem TE1, a data transmission connection CH5 is set up and at the same time partly also a communication channel CC3 e.g. via a public switched telephone network PSTN to the modem TE2 of the system SS. By means of the modem TE2, a fixed data transmission connection CH6 can be set up to the mobile communication network PLMN, normally to a mobile switching center MSC, wherein the transmitting network can be a PSTN network. By means of the radio modem RF3, a data transmission connection CH4 is set up via the radio channel to the PLMN network by means of a base station BS2. The public land mobile network PLMN consists e.g. of a base station BS1 for the first connection CH1, a base station BS2 for the third connection CH3 and the fourth connection CH4, and a mobile switching center MSC serving the base stations BS1 and BS2 to transmit messages via one or several communication channels CC1, CC2, CC3 to the control system SS. The mobile switching center MSC also communicates with a short message switching center SMSC to transmit messages. The functions of the base station BS2 can also be assumed by the base station BS1, if the server SRV or the control system SS is in the area of the cell served by the same, when the PLMN network is based on digital data transmission and a cellular system. Said cells are distributed over a wide geographical area to take care of the data transmission of communication devices MS moving within said area.

The memory means DB1 and processing means CTRL3 of the server SRV can be implemented e.g. by means of a data processor which comprises processing means for controlling the operation of the device, a random access memory and a bulk memory for storage, and normally also a keypad and a display, and which is controlled by means of a control program stored in the memory. Said control program is arranged in such a manner that said functions can be performed. It is also possible to connect the necessary modem devices to the device by means of a bus according to the data transmission connections. In an advantageous embodiment, the server SRV is located physically in the same device as the control system SS. At the same time, it can also function as the server for another control system. In the case of the same device, it is possible to combine for example the operation of the means CTRL2 and CTRL3, the operation of the means RF3 and RF2, the operation of the means DB1 and DB2, and the operation of the means TE1, TE2 and TE3.

The server used can also be a portable computer which is connected with a cable to a wireless communication device functioning as a modem, such as a mobile phone, which takes care of the data transmission by means of its antenna and radio parts. The communication device in question can also be a card-like wireless communication device connected to the expansion card connection of the computer, such as a card modem. The communication device can also be a PDA device (Personal Digital Assistant) intended for wireless communication, mobile phone functions being connected therewith. It is also obvious that said communication device MS can be said combination, wherein it is easy to generate the necessary control commands, which can be very diverse, by means of the computer to the system SS. Moreover, the control commands can be used for programming the operation of the system SS, wherein a communication device MS or server SRV with the required authorization can enter new key codes in the system.

For setting up the connection CH3 and thereby also the communication channel CC1 at least partly, the control system SS comprises means, such as a radio modem RF2 to set up a wireless third data transmission connection CH3 to the mobile communication network PLMN, which connection is arranged at least for receiving messages. By means of the modem TE2, a fixed data transmission connection CH6 is set up, and at the same time also partly a communication channel CC2 via the PSTN network to the PLMN network, normally to a mobile switching center MSC.

Figure 4:
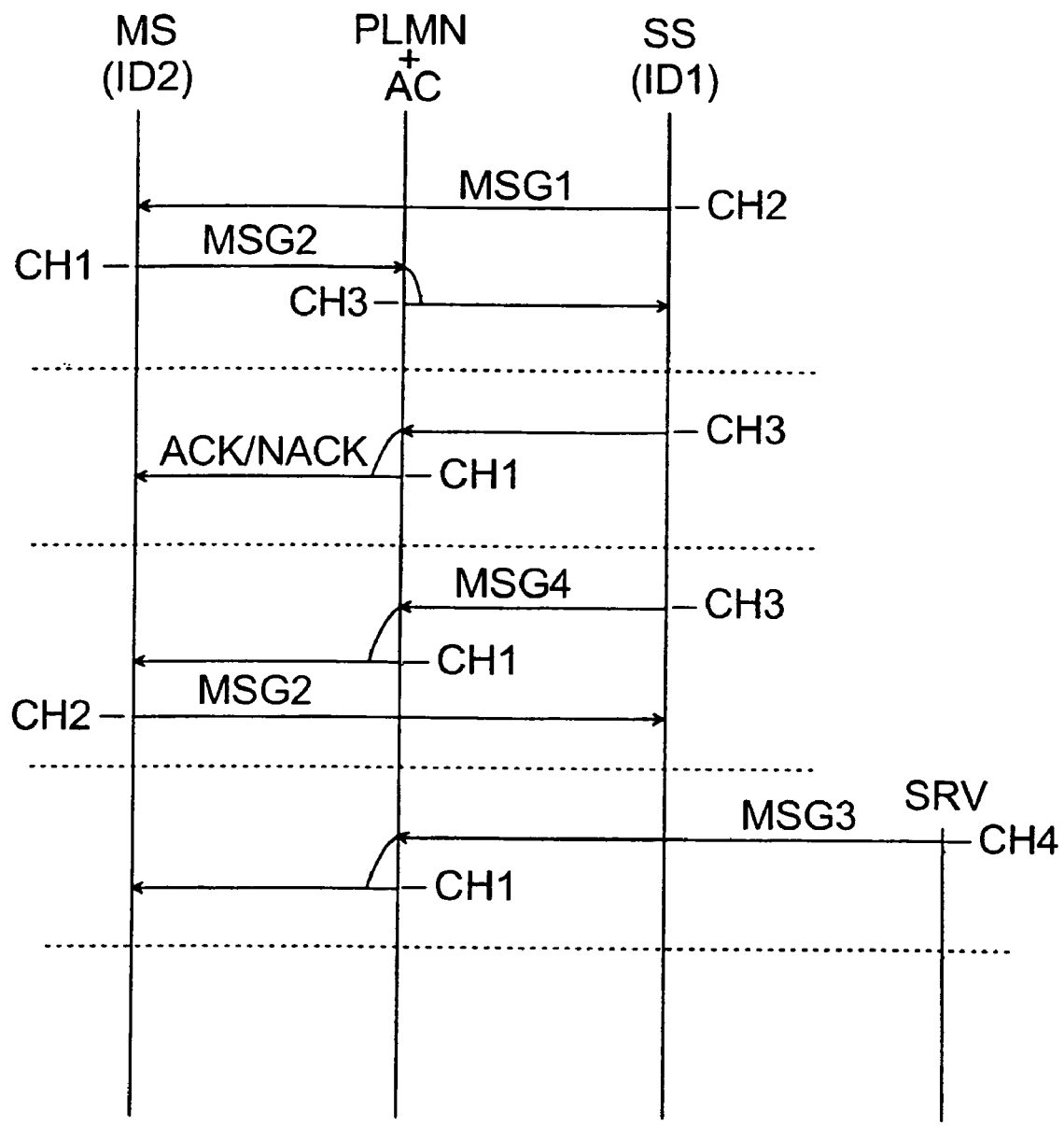
FIG. 4 is a schematic view showing the transmission of messages of different examples according to a first embodiment of the invention.

The transmission of messages between the different parts SS, PLMN and MS according to the invention is also illustrated in the chart of FIG. 4 which also shows the connection used. Furthermore, different example expansions are separated from each other with broken lines.

With reference to FIG. 1 and in the second embodiment of the invention, the control system SS is arranged to be controlled with a wireless communication device MS which comprises at least means RF1 for setting up a wireless first communication connection CH1 to the mobile communication network PLMN, the connection CH1 being arranged for transmitting and receiving messages. The communication device MS also comprises means IR1 for setting up a short distance second data transmission connection CH2, which is arranged at least for transmitting messages, and control means CTRL1 for setting up messages to be transmitted and for interpreting received messages, as well as memory means SIM for storing messages. What is described above on the more specific operation or assembly of e.g the communication device MS or the network PLMN, can also be applied in this embodiment of the invention.

In the presented embodiment, the control messages are primarily transmitted via the second connection CH2. The reception of the control message MSG2 may be preceded by the transmission of an identification message MSG1. Furthermore, the dispatch of key codes is arranged from the server SRV, or from another communication device, e.g. to the communication device MS via the first connection CH1. The server SRV can maintain key codes and information related to the system SS. Said control system SS comprises means IR2 for setting up a short distance wireless second data transmission connection CH2 to said communication device when it is within said service area, the connection being arranged at least for receiving the control message MSG2. Said connection MSG2 is for example a short distance radio frequency (SDRF), low power radio frequency (LPRF) or infrared (IR) connection. The system also comprises processing means CTRL2 for interpreting the control message transmitted from the communication device and received via the second data transmission connection CH2, the message comprising data CMD for controlling the control system in a desired manner, and preferably also control means LS for controlling the operation of the control system on the basis of the control message. The means LS can be arranged to be separate, as described above. What has been described above on the more specific operation and assembly of the control system SS, can also be applied in this embodiment of the invention.

In an advantageous embodiment of the invention, the mobile communication network PLMN is arranged for transmitting messages via one or several communication channels CC1 and/or CC2. Said processing means CTRL2 are also arranged to interpret the control message MSG2 received via a communication channel, the message comprising data CMD for controlling the control system in a desired manner. According to yet another embodiment, the mobile communication network PLMN also comprises authentication means AC for identifying the communication device MS and for allowing the transmission of messages. The authentication means AC are also arranged to add data ID2 identifying said communication device MS in the control message MSG2 to be transmitted. The operation and function of the means AC is based on the facts presented above in connection with the first embodiment of the invention. In the control message MSG2 is also included, with the AC means, e.g. the telephone number of the communication device MS that transmitted the control message, to identify said communication device. Authentication can now be utilized particularly to secure the dispatch of key codes.

In one embodiment, the control system SS also comprises memory means DB2 for storing one or more acceptable key codes KC1 and KC2. In case the received control message MSG2 also contains the key code KC0, the processing means CTRL2 are also arranged to compare the key code of the control message with the acceptable key codes, to allow or to prevent the control. It can also be arranged that as a response to the control message MSG2, the processing means CTRL2 are arranged to transmit an acknowledgement message MSG4 via a communication channel to the communication device MS. Said message contains data, such as a key code KC1 or KC2 of the acceptable key codes, the data being supplemented with a new control message MSG2 which is transmitted from said communication device MS via a second communication channel CH2. In this way it is secured that the correct communication device MS is e.g. in the vicinity of a door to be opened.

With reference to FIG. 2 and according to an advantageous embodiment of the invention, the control system SS is provided with a server SRV which comprises means, such as a modem TE1, a modem TE3 or a radio modem RF3, to transmit key messages MSG3 via a communication channel CC1, CC2 or CC3 to the control system SS. The server SRV also comprises processing means CTRL3 for maintaining one or several acceptable key codes KC1, KC2. In this case, said key message MSG3 contains data, such as the codes KC1, KC2 of the acceptable key codes, for storing them in the control system SS for comparison. The means TE3 and RF3 of the server SRV can be arranged for the transmission of messages also via a mobile communication network PLMN to the communication device MS, which message contains data on acceptable key codes for storing them in the memory means SIM of the communication device.

The server SRV is used for maintaining and managing data, for example by means of databases, listings and registers. Thus, the server SRV also comprises memory means DB1 e.g. for storing acceptable key codes KC1, KC2, for storing data ID1 of each security system to be controlled with an acceptable key code, and for storing data ID2 on the communication device MS entitled to an acceptable key code. These data are changed and supplemented, if necessary, e.g. by the service provider. By means of the data, it is possible to keep up with given rights of use and to use the data to dispatch information to security systems or communication devices in an efficient and centralized manner. For example, it is possible to delete key codes from the system to prevent use and to give the necessary control messages or key messages to the system SS. The server SRV can contain a data record which connects a certain key code to a group of communication devices, wherein all the communication devices belonging to the group can transmit a control message MSG2 to the system SS. What has been described above e.g. on the more specific operation and assembly of the server SRV and the communication channels, can also be applied in this embodiment of the invention.

To improve security further, the control of the control system can be arranged in such a way that as a response to the control message MSG2 transmitted by the communication device MS, the processing means CTR2 are arranged to transmit to said communication device a message in which it requests the communication device MS to transmit a new control message MSG2 via the second communication channel CH2. The new control message comprises for example an acceptable password which is entered e.g. via the keypad of a mobile phone and added to said control message MSG2. By means of the arrangement it can be secured that the communication device MS which has transmitted the control message MSG2 is located e.g. in the vicinity of a door and that said communication device MS is used by a person who knows the required password. It is obvious that control messages MSG2 of the communication device transmitted via the connection CH1 can be directed either to the system SS or to the server SRV which can transmit the above-mentioned request.

In one embodiment, as a response to the control message MSG2, the processing means CTRL2 of the system SS or alternatively the processing means CTRL3 of the server SRV are arranged to transmit an acknowledgement message MSG4 via the mobile communication network PLMN to the communication device MS. The key code of the message is then added to the control message MSG2 which is transmitted by the communication device MS via the second data transmission connection CH2. The control system SS can also acknowledge the different control messages MSG2 as received.

The dispatch of key codes can also be arranged in such a way that another wireless communication device communicates with the PLMN network in the above described manner. The communication device, such as a mobile phone complying with the GSM system, generates the required key message MSG3 to transmit it via the mobile communication network PLMN to the communication device MS, the message containing data on acceptable key codes KC1, KC2. The message can be for example a short message as presented above, and the PLMN network thereby utilizes the operation of the AC means. The communication device MS can also transmit a control message to the server SRV or to the system SS, which has the result that the key message is transmitted to another wireless communication device via the PLMN network, preferably in an encrypted manner, to dispatch the key codes. At the same time, data is maintained on to whom key codes have been delivered. The control message MSG3 thus contains for example data to identify the system SS and the wireless communication device.

The processing means CTRL1 of the wireless communication device, such as a mobile station or a mobile phone, comprise e.g. means for reading the data of the SIM card and for storing data on the SIM card, a control unit (CU) which comprises preferably a micro controller unit (MCU) and a control logic circuit, such as an application specific integrated circuit (ASIC). The control unit is preferably also connected with a memory, such as a read only memory (ROM) and a random access memory (RAM). The communication device is also provided with display means, keypad means and audio means. The control unit is also connected to the control blocks controlling the other operations of the communication device, for controlling the receiving and transmitting functions, input/output (I/O) functions and the radio parts of the device. In the transmission and reception of radio signals, an antenna is used which, together with the radio parts, constitutes the means RF1. The communication device MS operates under the control of a control program, in which changes can be made to create the necessary procedures to generate messages and e.g. to process key codes. Thus, the operation of the user interface of the communication device can be arranged to have such menu functions that it is also possible to select from the different functions the use for the control of the control system, by means of the connections CH1 and/or CH2. If desired, the control program can also automatically take care of part of the traffic, such as reception of an acknowledgement message and reporting to the user e.g. by means of the display means.

In view of the foregoing, one versatile communication device MS comprises, according to an advantageous embodiment, at least said means RF1 for setting up a data transmission connection CH1 to the mobile communication network PLMN for receiving key messages MSG3 and for transmitting control messages MSG2. Said PLMN network is arranged to transmit messages via a communication channel CC1, CC2 or CC3 to the control system SS, and it also comprises authentication means AC. It is obvious that the PLMN network normally independently selects the channel, wherein the user of the communication device MS does not need to take care of its selection. Further, the communication device MS comprises means IR1 for setting up a data transmission connection CH2 which is arranged for receiving an identification message MSG1 and for transmitting control messages MSG2. Moreover, the communication device MS has control means CTRL1 for generating messages to be transmitted and for interpreting received messages, as well as for adding data ID1 and an acceptable key code KC1, KC2 to the control message MSG2. Also, memory means SIM are required for storage.

In modern public land mobile networks (PLMN) based on a cellular network, the system consists in a known manner of several mobile stations (MS), such as mobile phones, using the system and of a fixed base station subsystem (BSS). This base station subsystem normally comprises several base transceiver stations (BTS) which are distributed over a geographical area, each base station serving a cell which comprises at least part of this geographical area.

The wireless communication system makes a wireless data transmission connection possible between the mobile station (MS) and the fixed parts of the system when the user of the mobile station moves within the operating range of the system. A typical system is a modern public land mobile network (PLMN) based on a cellular system, which is e.g. a widely known circuit switched Global System for Mobile Communications (GSM). The present invention is particularly suited for mobile communication systems under development. As an example of such a mobile communication system, the General Packet Radio Service (GPRS) system is used in this specification. It is obvious that the invention can also be applied in other mobile communication systems (UMTS, 3G). The basic idea of the GPRS system is to use packet-switched resource allocation for GSM compatible mobile stations within the GSM infrastructure, wherein a so-called virtual data transmission connection is set up between e.g. a base transceiver station BTS and a mobile station MS. The above-mentioned WAP application protocol is used as an example of communication protocols, wherein WAP clients, such as said communication device MS and system SS, and WAP servers, such as the server SRV, are preferably clients and servers of a communication network applying the WAP application protocol. The different devices, servers and information can thus be named in the network with a Uniform Resource Locator (URL) address which is irrespective of the location and is known e.g. from the World Wide Web (WWW) network and which can be used as said identification ID1 and ID2.

Figure 3:
FIG. 3 illustrates messages used in the invention.
Figure 3:
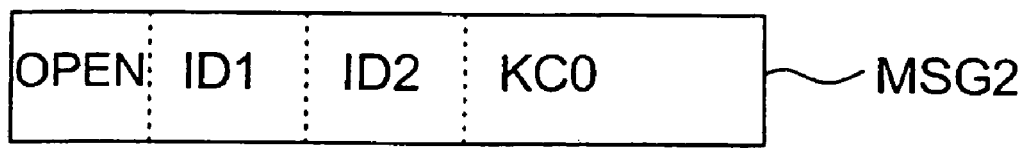
Figure 3:
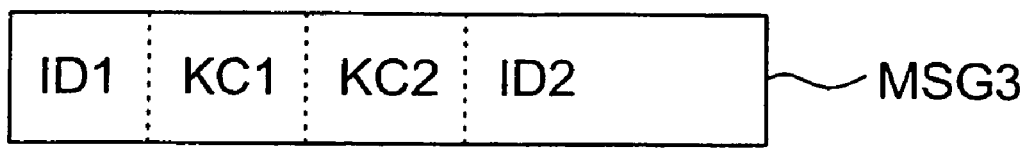
Figure 3:
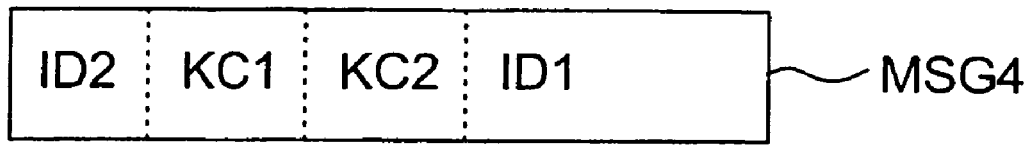
Figure 5:
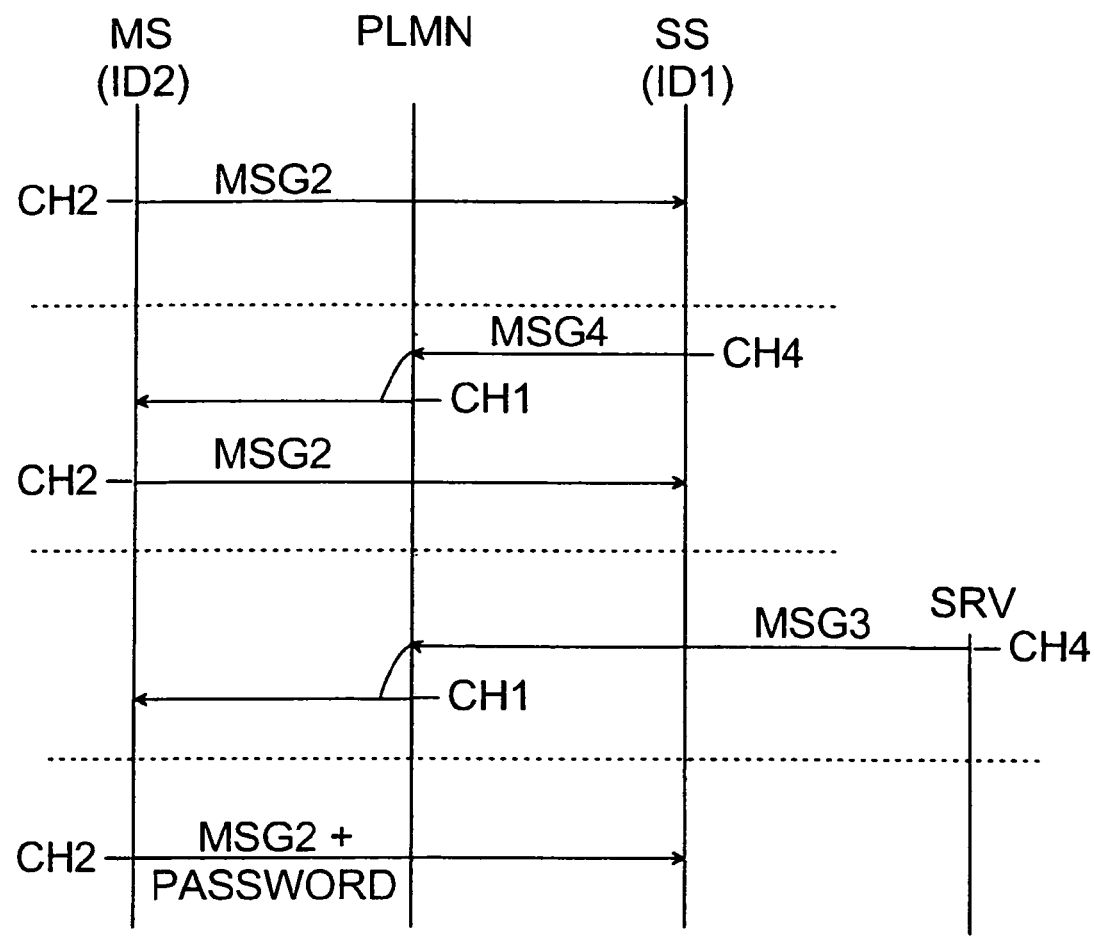
FIG. 5 is a schematic view showing the transmission of messages of different examples according to a second embodiment of the invention.

The transmission of messages between the different parts SS, PLMN and MS according to the invention is also illustrated in the chart of FIG. 5, which also shows the connection used. The different example expansions are also separated from each other with broken lines. FIG. 3 shows some advantageous embodiments of messages. The identification message MSG1 contains data ID1 identifying the security system SS, such as a sequence of numbers and letters, a name, or a serial number. The identifying data ID1 can also be the Mobile Subscriber International ISDN number MSISDN. In a corresponding manner, it is possible to use strings of numbers or letters which are only significant for the person who knows the MSISDN number of the security system SS, wherein e.g. in the memory means SIM of the communication device MS, data can be used to search for the correct MSISDN number (mapping). By means of the functions of the mobile station MS, the ID1 can be stored in the memory and, if necessary, given an easy name which can be searched with the help of menus. By means of the menus, it is also possible to select the function needed, e.g. the transmission of a control message. The control message MSG2 comprises e.g. a command CMD relating to an operation which the system SS is expected to perform (OPEN), the identification ID1 or the MSISDN number selected on the basis of the same, which can also be arranged to be searched by means of the databases of the network in order to direct the message to the correct system. The network also supplements the message with the identification ID2 of the sender of the message for identification. For control, the control message may also contain a key code KC0 which must be an acceptable key code in order to make control possible. By means of a key message MSG3, the acceptable key codes, such as codes KC1 and KC2, are transmitted to the receiver ID1. The key message may also contain information about which communication device, i.e. identification ID2, is authorized to use the key codes in question. It is obvious that often the key message MSG3 must also be equipped with the key code KC0 which the recipient checks to verify the authentication of the key message. By means of an acknowledgement message MSG4, it is possible to transmit the acceptable key codes KC1 and KC2 to the receiver, such as identification ID2. The acknowledgement message is often also equipped with the identification ID1 of the system SS, so that e.g. the communication device MS would be able to select the key code belonging to the system in question.

The present invention is not limited solely to the examples presented above, but it can be modified within the scope of the appended claims.

What is claimed is:

1. A control system, comprising:
    a device for setting up a short distance second data transmission connection to a wireless communication device when said wireless communication device is within said short distance, the second data transmission connection being arranged for transmitting at least an identification message to said wireless communication device, the identification message containing data for identifying said control system,
    a receiver for receiving a control message as a response to said identification message via a communication channel from a mobile communication network, wherein said mobile communication network is arranged to set up a wireless first data transmission connection to said wireless communication device for the transmission of said control message, and wherein said mobile communication network comprises an authentication module for identifying said wireless communication device and allowing or preventing the transmission of said control message, and
    a processor for interpreting said control message transmitted from said wireless communication device and received via said communication channel from said mobile communication network, the control message comprising at least data for controlling the control system in a desired manner.

2. The control system according to claim 1, wherein the authentication module is also arranged for adding data identifying the wireless communication device in the control message.

3. The control system according to claim 2, wherein the control message contains at least the telephone number of the wireless communication device that sent said control message, to identify said wireless communication device.

4. The control system according to claim 1, wherein the control message contains at least the telephone number of the wireless communication device that sent said control message, to identify said wireless communication device.

5. The control system according to claim 1, wherein the control message contains at least data for identifying the control system for the transmission of the control message.

6. The control system according to claim 1, further comprising a memory for storing at least one acceptable key code, and wherein, in case the received control message contains a key code, the processor is arranged to compare the key code of the control message with said at least one acceptable key code, to allow or prevent the control.

7. The control system according to claim 6, wherein the key code contains at least data identifying the wireless communication device that transmitted the control message.

8. The control system according to claim 6, wherein the key code contains at least the telephone number of the wireless communication device that transmitted the control message.

9. The control system according to claim 6, wherein said control system is arranged to receive a key message transmitted from a server via a communication channel, the key message containing data on an acceptable key code for its storage in the control system for comparison.

10. The control system according to claim 9, wherein a key message is arranged to be transmitted from a server via the mobile communication network to a wireless communication device, the key message containing data on an acceptable key code for storing it in said wireless communication device and adding it in the control message transmitted by said wireless communication device.

11. The control system according to claim 1, further comprising
a memory for storing at least one acceptable key code, wherein, as a response to the control message, the processor is arranged to transmit an acknowledgement message via a communication channel to the mobile communication network to be transmitted to the wireless communication device, the acknowledgement message comprising data on said at least one acceptable key code to be supplemented with a new control message to be transmitted from said wireless communication device, and
wherein said new control message is arranged to be received via said second data transmission connection.

12. The control system according to claim 11, wherein said control system is arranged to receive a key message transmitted from a server via a communication channel, the key message containing data on an acceptable key code for its storage in the control system for comparison.

13. The control system according to claim 12, wherein a key message is arranged to be transmitted from a server via the mobile communication network to a wireless communication device, the key message containing data on an acceptable key code for storing it in said wireless communication device and adding it in the control message transmitted by said wireless communication device.

14. The control system according to claim 11, wherein a key message is arranged to be transmitted from a server via the mobile communication network to a wireless communication device, the key message containing data on an acceptable key code for storing it in said wireless communication device and adding it in the control message transmitted by said wireless communication device.

15. The control system according to claim 1, wherein said receiver is arranged to receive a key message transmitted from a server via a communication channel, the key message containing data on an acceptable key code for its storage in the control system for comparison.

16. The control system according to claim 1, wherein a key message is arranged to be transmitted from a server via the mobile communication network to a wireless communication device, the key message containing data on an acceptable key code for storing it in said wireless communication device and adding it in the control message transmitted by said wireless communication device.

17. The control system according to claim 16, wherein at least some of the messages are SMS messages to be transmitted in the mobile communication network.

18. The control system according to claim 1 further comprising a controller for controlling the operation of the control system on the basis of the control message.

19. The control system according to claim 1, wherein for setting up a communication channel to the mobile communication network, the control system further comprises a radio modem for setting up a wireless third data transmission connection to the mobile communication network.

20. The control system according to claim 1, wherein at least some of the messages are SMS messages to be transmitted in the mobile communication network.

21. The control system according to claim 1, wherein said device for setting up the short distance second data transmission connection to the wireless communication device when said wireless communication device is within said short distance comprises an infrared transmitter.

22. A wireless communication device for controlling a control system, comprising:
a device for setting up a wireless first data transmission connection to a mobile communication network, the wireless first data transmission connection being arranged for transmitting and receiving messages,
a device for setting up a short distance wireless second data transmission connection, the second data transmission connection being arranged at least for receiving messages,
a controller for generating messages to be transmitted and for interpreting received messages, and
a memory for storing the messages,
wherein said wireless communication device is arranged for receiving an identification message via the second data transmission connection from the control system when the control system is within said short distance, the identification message containing data for identifying said control system, and
wherein said wireless communication device is arranged for transmitting a control message as a response to said identification message via the wireless first data transmission connection to said control system, the control message containing data for controlling said control system in a desired manner, and
wherein said mobile communication network comprises an authentication module for identifying said wireless communication device and allowing or preventing the transmission of the control message.

23. The wireless communication device according to claim 22, arranged for receiving a key message via the mobile communication network, the key message containing data on an acceptable key code for adding it in the control message transmitted by the wireless communication device, and wherein said memory is arranged for storing said acceptable key code.

24. The wireless communication device according to claim 22, wherein said device for setting up the short distance wireless second data transmission connection comprises an infrared receiver.

25. A control system, comprising:
a device for setting up a short distance wireless second data transmission connection to a wireless communication device when said wireless communication device is within a short distance, the wireless second data transmission connection being arranged at least for receiving a control message, the control message containing at least data for controlling the control system in a desired manner,
a receiver for receiving messages via a communication channel from a mobile communication network which is arranged for setting up a wireless first data transmission connection to said wireless communication device for the transmission of said messages, a processor for interpreting the control message transmitted from said wireless communication device and received via the wireless second data transmission connection, wherein, as a response to said control message, the processor is arranged to transmit an acknowledgement message via a communication channel to the mobile communication network and to the wireless communication device, the acknowledgement message containing data on an acceptable key code to be added to a new control message to be transmitted from said wireless communication device, and wherein said new control message is arranged to be received via the wireless second data transmission connection.

26. The control system according to claim 25, wherein the processor is arranged for interpreting a control message received via the communication channel from the mobile communication network.

27. The control system according to claim 26, wherein said mobile communication network further comprises an authentication module for identifying said wireless communication device and for allowing or preventing the transmission of the control message, and wherein the authentication module is also arranged for adding data identifying said wireless communication device into the control message to be transmitted.

28. The control system according to claim 27, wherein the control message contains at least the telephone number of the wireless communication device that transmitted the control message, to identify said wireless communication device.

29. The control system according to claim 26, further comprising a memory for storing at least one acceptable key code.

30. The control system according to claim 26, wherein said receiver is arranged also for receiving a key message transmitted from a server via a communication channel, the key message containing data on an acceptable key code for storing it in the control system for comparison.

31. The control system according to claim 30, wherein the server further comprises a memory for storing the acceptable key code, for storing data identifying the control system to be controlled by the acceptable key code, and for storing data identifying the wireless communication device entitled to the acceptable key code.

32. The control system according to claim 30, wherein a key message is arranged to be transmitted from the server via the mobile communication network to the wireless communication device, the key message containing data on the acceptable key code for storing it in said wireless communication device.

33. The control system according to claim 26, wherein a key message is arranged to be transmitted from a server via the mobile communication network to the wireless communication device, the key message containing data on an acceptable key code for storing it in said wireless communication device.

34. The control system according to claim 33, wherein the server further comprises a memory for storing the acceptable key code, for storing data identifying the control system to be controlled by the acceptable key code, and for storing data identifying the wireless communication device entitled to the acceptable key code.

35. The control system according to claim 26, wherein, as a response to the control message transmitted by the wireless communication device, the processor is arranged to transmit a message to said wireless communication device regarding the transmission of a new control message via the wireless second data transmission connection, the new control message containing at least an acceptable password.

36. The control system according to claim 26, wherein, as a response to the control message, the processor is arranged to transmit a key message via the mobile communication network to the wireless communication device, the key message containing data on an acceptable key code to be added to a new control message to be transmitted from said wireless communication device, and wherein said new control message is arranged to be received via the wireless second data transmission connection.

37. The control system according to claim 26, wherein, as a response to the control message transmitted by the wireless communication device, the control system is arranged to transmit a key message via the mobile communication network to another wireless communication device, the key message containing data on an acceptable key code.

38. The control system according to claim 25, wherein the control message contains at least the telephone number of the wireless communication device that transmitted the control message, to identify said wireless communication device.

39. The control system according to claim 25, further comprising a memory for storing at least one acceptable key code, and wherein, in case the received control message also contains a key code, the processor is arranged to compare the key code of the received control message with said at least one acceptable key code, to allow or prevent the control.

40. The control system according to claim 39, wherein the key code contains at least data identifying the wireless communication device that transmitted the control message.

41. The control system according to claim 40, wherein the key code contains at least the telephone number of the wireless communication device that transmitted the control message.

42. The control system according to claim 39, wherein the key code contains at least the telephone number of the wireless communication device that transmitted the control message.

43. The control system according to claim 25, further comprising a controller for controlling the operation of the control system on the basis of the control message.

44. The control system according to claim 25, wherein said device for setting up the short distance wireless second data transmission connection to the wireless communication device when said wireless communication device is within said short distance comprises an infrared receiver.

45. A wireless communication device for controlling a control system, comprising:

a device for setting up a wireless first data transmission connection to a mobile communication network, the wireless first data transmission connection being arranged for the transmission and reception of messages, a device for setting up a short distance wireless second data transmission connection which is arranged at least for receiving messages, a controller for generating messages to be transmitted and for interpreting received messages, and a memory for storing messages, wherein said wireless communication device is arranged for transmitting a control message via the second data transmission connection to the control system when the control system is within said short distance, the control message containing data for controlling said control system in a desired manner, and wherein said wireless communication device is also arranged for receiving, as a response to said control message, a key message via the mobile communication network, the key message containing data on an acceptable key code for adding the key code to a new control message to be transmitted by the wireless communication device via the second data transmission connection to the control system.

46. The wireless communication device according to claim 45, wherein said memory is arranged for storing said acceptable key code.

47. The wireless communication device according to claim 46, wherein said wireless communication device is also arranged for transmitting a key message via the mobile communication network to another wireless communication device, the key message containing data on an acceptable key code.

48. The wireless communication device according to claim 45, wherein said wireless communication device is also arranged for transmitting a key message via the mobile communication network to another wireless communication device, the key message containing data on an acceptable key code.

49. The wireless communication device according to claim 45, wherein said device for setting up the wireless first data transmission connection to the mobile communication network comprises an infrared transmitter.

* * * * *